C. O. LANDGREBE.
COUPLING FOR SHAFTS.
APPLICATION FILED NOV. 22, 1913.

1,120,510.

Patented Dec. 8, 1914.

UNITED STATES PATENT OFFICE.

CARL OTTO LANDGREBE, OF DRESDEN, GERMANY.

COUPLING FOR SHAFTS.

1,120,510.  Specification of Letters Patent.  Patented Dec. 8, 1914.

Application filed November 22, 1913. Serial No. 802,494.

*To all whom it may concern:*

Be it known that I, CARL OTTO LANDGREBE, a subject of the King of Prussia, residing at Dresden, Germany, have invented certain new and useful Improvements in Couplings for Shafts, of which the following is a specification.

My invention relates to a coupling for machine parts (especially shafts) which, in addition to the purely axial movement, must also be able to have a movement at an angle. According to this invention these coupling parts are so constructed that both the axial and the angular movement are performed with a minimum of friction. One machine part may, for example, end in a coupling sleeve provided with ribs arranged axially while the other may end in one or more disks shaped to correspond with the inner cross section of the coupling sleeve, around the circumference of which disks balls are suitably embedded, facilitating the axial movement of the parts and allowing of the angular movement.

It has, of course, already been proposed to introduce ball bearings in the case of machine parts moving axially with regard to one another, with the object of reducing the friction as much as possible. In the present case however, there is the question of providing not only for the axial movement but also for the relative angular movement of the machine parts, without friction being set up.

The object of the invention is represented in the accompanying drawings in two constructions, as follows:—

Figure 1:
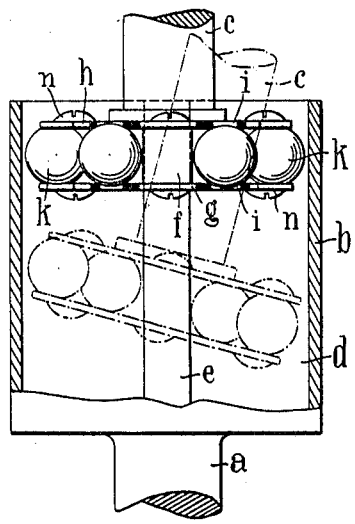
Figure 2:
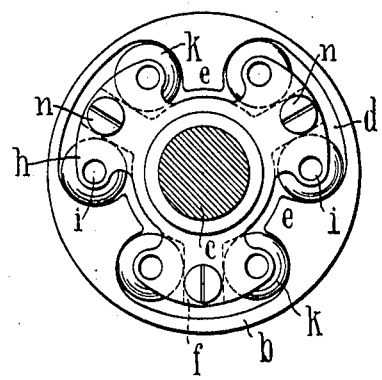

Figure 1 shows in elevation and section a construction whereby a movement of the coupled parts in both directions of rotation is rendered possible. Fig. 2 is a plan of Fig. 1.

Referring first to the coupling represented in Figs. 1 and 2, one shaft, for example, the driven shaft $a$, has a coupling sleeve $b$ which is provided internally with axially arranged projections or ribs $e$ forming between each other hollows or grooves $d$. The driving shaft $c$ carries at the end arms $f$ on which disks $g$, $h$, forming ball cages, are fixed by means of screws $n$. In these disks holes $i$ are made between which the balls $k$, projecting beyond the edges of the disks, are embedded.

In Fig. 1 the parts, when moving axially one with respect to the other, are represented by full lines, while the driving shaft $c$ and the ball cages or beds connected therewith are shown in the angular position by dotted lines.

I do claim:—

1. Coupling for shafts comprising in combination, a driven shaft, a coupling sleeve provided with inner axially arranged projections, a driving shaft provided with arms, holding disks secured to said arms and provided with circular openings and balls between said holding disks resting displaceably in said openings and having a diameter larger than the distance between said disks, substantially as described.

2. Coupling for shafts comprising in combination, a driven shaft, a coupling sleeve provided with inner axially arranged projections, a driving shaft, provided with arms, ball cages secured to the ends of said arms and provided with holes, and balls projecting beyond the edges of said cages and embedded between said holes, substantially as described and for the purpose set forth.

In testimony whereof I have hereunto set my hand in presence of two subscribing witnesses.

CARL OTTO LANDGREBE.

Witnesses:
 ALFRED SEEHAUS,
 HEINRICH SIEBEL.